(12) United States Patent
Hedley et al.

(10) Patent No.: US 6,347,686 B1
(45) Date of Patent: Feb. 19, 2002

(54) ACCESS DEVICE

(75) Inventors: Robert Ian Hedley, Milbrodale via Singleton; Christopher Nash Whybin, Branxton, both of (AU)

(73) Assignee: Hedwel Engineering Pty. Ltd. (AU)

( * ) Notice: Subject to any disclaimer, the term of this patent is extended or adjusted under 35 U.S.C. 154(b) by 0 days.

(21) Appl. No.: 09/613,863

(22) Filed: Jul. 10, 2000

Related U.S. Application Data

(63) Continuation of application No. 08/989,193, filed on Dec. 11, 1997, now abandoned.

(51) Int. Cl.[7] .................................................. E06C 9/00
(52) U.S. Cl. .......................................... 182/86; 182/127
(58) Field of Search ............................ 182/95, 84, 127, 182/83, 85, 86, 88, 97; 280/166; 14/69.5

(56) References Cited

U.S. PATENT DOCUMENTS 3,097,721 A * 7/1963 Thym
4,275,664 A * 6/1981 Reddy
4,685,858 A * 8/1987 Manning

* cited by examiner

*Primary Examiner*—Alvin Chin-Shue
(74) *Attorney, Agent, or Firm*—Cesari and McKenna, LLP

(57) ABSTRACT

An access device for providing access between a lower level and an upper level the access device including a main body mounted for pivotal movement about a main body pivot mounting between an access position in which it enables access between the upper and lower levels and a stowed position in which a substantial part thereof is disposed above the main body pivot mounting; a drive mechanism operable to cause movement of the main body between the operative and stowed positions, the drive mechanism including a drive device and a link mechanism, the link mechanism including control link means mounted for pivotal movement about a control link pivot mounting, the control link being operatively connected to the drive device at a first connecting point, coupling link means operatively connecting the main body to the control link means, the coupling link means being connected to the main body at a second connecting point, the arrangement being such that actuation of the drive means causes the connection between the coupling means and the main body to be displaced upwardly or downwardly to move the main body between the access position and the stowed position.

10 Claims, 3 Drawing Sheets

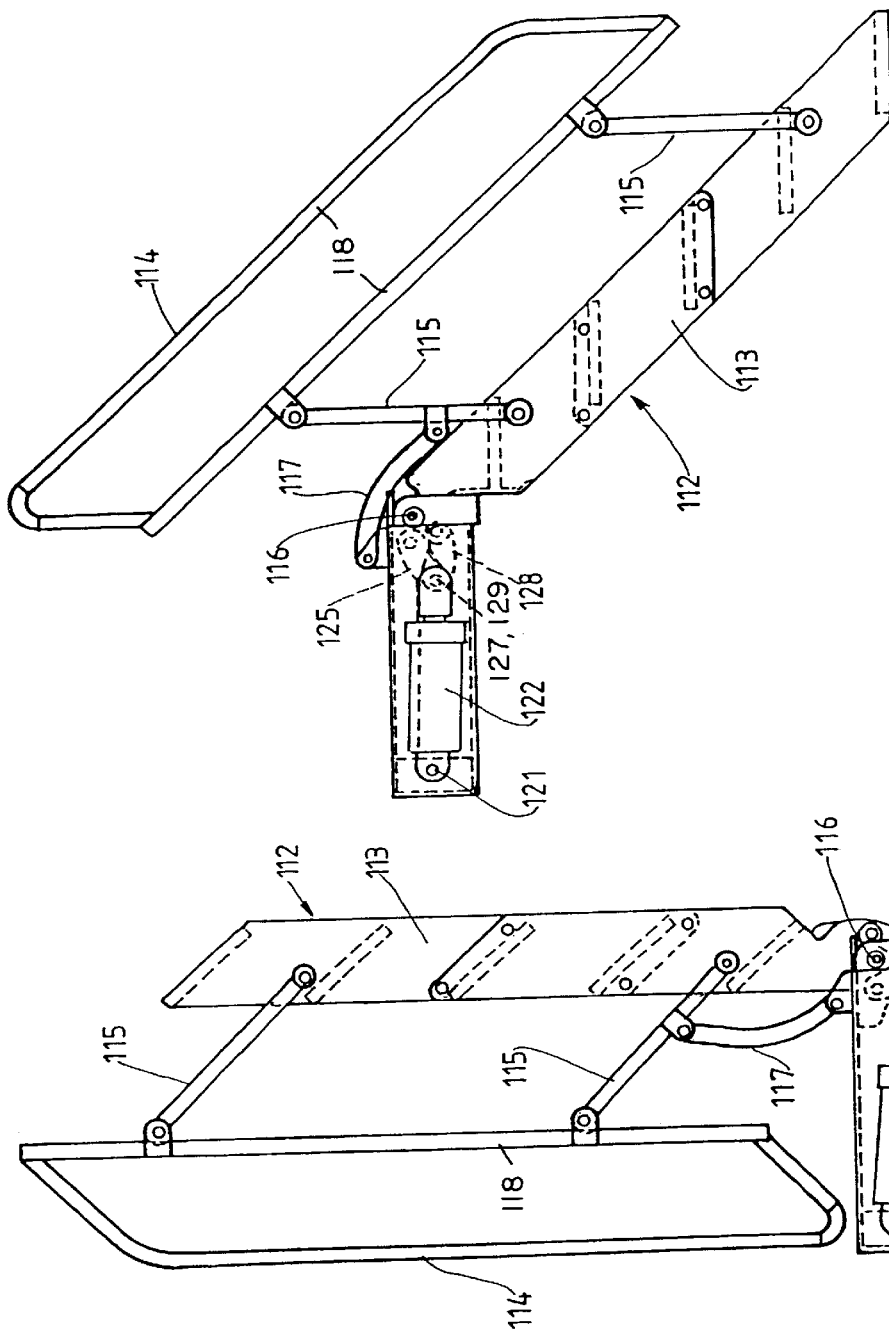

ACCESS DEVICE

This is a continuation of Ser. No. 08/989 193, filed Dec. 11, 1997, abandoned.

The present invention relates generally to an access device for providing access between a lower level and an upper level. More particularly, the invention is concerned with an improved drive mechanism for moving the access device between an operative position and a stowed position.

Access devices of the general type to which the present invention relates are known. One such device is described in Australian Patent 672706. The device described provides for access between a lower level and an upper level by providing a pair of rigid arms on each side member of the access device, such that, the device is pivotally moveable from a stable lower position to a stable upper position.

It is desirable that in some circumstances that the drive mechanism be relatively compact and an object of the present invention is to provide an access device which can meet this requirement.

According, to the present invention there is provided an access device for providing access between a lower level and an upper level the access device including a main body mounted for pivotal movement about a main body fixed pivot mounting between an access position in which it enables access between the upper and lower levels and a stowed position in which a substantial part thereof is disposed above the main body fixed pivot mounting; a drive mechanism operable to cause movement of the main body between the operative and stowed positions, the drive mechanism including a drive device and a link mechanism, the drive device comprising a linear actuator which includes a body portion pivotally mounted to a fixed structure and a drive member which can move in the direction of its longitudinal axis in a linear fashion relative to the body portion, the link mechanism including control link means mounted for pivotal movement about a control link fixed pivot mounting, the control link means being operatively connected to the drive member at a fist connecting point, the main body fixed pivot mounting and the control link fixed pivot mounting being laterally disposed to the same side by the longitudinal axis of the drive member, coupling link means operatively connecting the main body to the control link means, the coupling link means being connected to the main body at a second connecting point, spaced from the main body fixed pivot mounting, the arrangement being such that actuation of the drive member causes linear movement thereof which causes the connection between the coupling means and the main body to be displaced upwardly or downwardly to move the main body between the access position and the stowed position.

Preferably the upwards/downwards displacement of the first connection point is substantially less than the upward/downward displacement of the second connection point during movement between the access and the stowed positions.

Preferably the connection between the control links means and the coupling link means is such to cause the coupling link means to move towards a generally upright orientation when the main body is moved towards the stowed position.

Preferably the first connection point is adapted to swing through a substantially flat arc with respect to the horizontal when moving between the two positions.

In one preferred form the drive device may include an hydraulic piston/cylinder assembly, the cylinder being pivotally mounted to a fixed structure and the piston being operatively connected to the control link means at the first connecting point.

Preferably when the main body is in the access position the first connecting point is disposed above the connecting point between the control and coupling links and when in the stowed position the first connecting point is disposed below the connecting point.

The main body may in one form include an elongated member which in the access position, extends between the upper and lower positions with one end thereof being adjacent or resting on the lower level and the other end being adjacent the upper level and in this position, the main body being inclined with respect to a vertical axis and in the stowed position is disposed generally upright above the upper level and preferably vertically above the main body pivot mounting point. For example the main body may be in the form of a ladder or stairway or a ramp.

Preferably, the control link pivot mounting and the first and second connecting points are spaced from one another so that a line drawn from the first connecting point to the control pivot mounting and then from the control link pivot mounting to the second connecting point is generally V-shaped.

Preferably, the linear actuator is disposed generally horizontally.

The device may further include a hand rail assembly which includes a frame section operatively connected to the main body by at least one support arm, the or each arm being pivotally mounted between the main body and a fixed support so that it can pivot during movement of the main body between the access and stowed positions thereby permitting displacement of the frame section and a guide arm operatively connected between the fixed support and the main body or support arm to regulate the displacement of the main body.

Preferred embodiments of the invention will hereinafter be described with reference to the accompanying drawings, and in those drawings:

FIGS. 3 and 4 are schematic side elevations of the device shown in FIG. 2 in the stowed and access positions.

Figure 1:
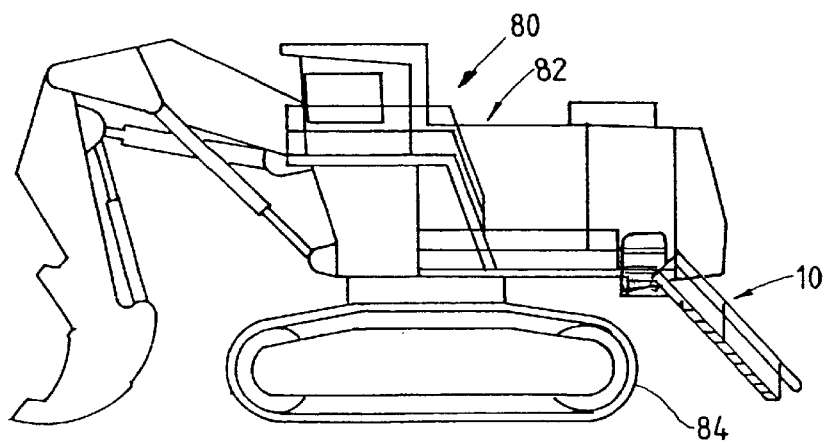
FIG. 1 is a schematic side elevation showing one application of the access device according to the invention.

Referring to the drawings there is shown an access device generally indicated at 110. As shown in FIG. 1 the access device 110 can be mounted to a vehicle which in the particular form shown comprises an excavating vehicle 80 which includes an upper main body 82 and a lower ground engaging track laying section 84, the upper body 82 being capable of rotation about a generally upright axis relative to the track laying section 84. The upper level in the excavator 80 is the upper body 82, thereby enabling the vehicle operator to access the vehicle cabin from the ground.

Figure 2:
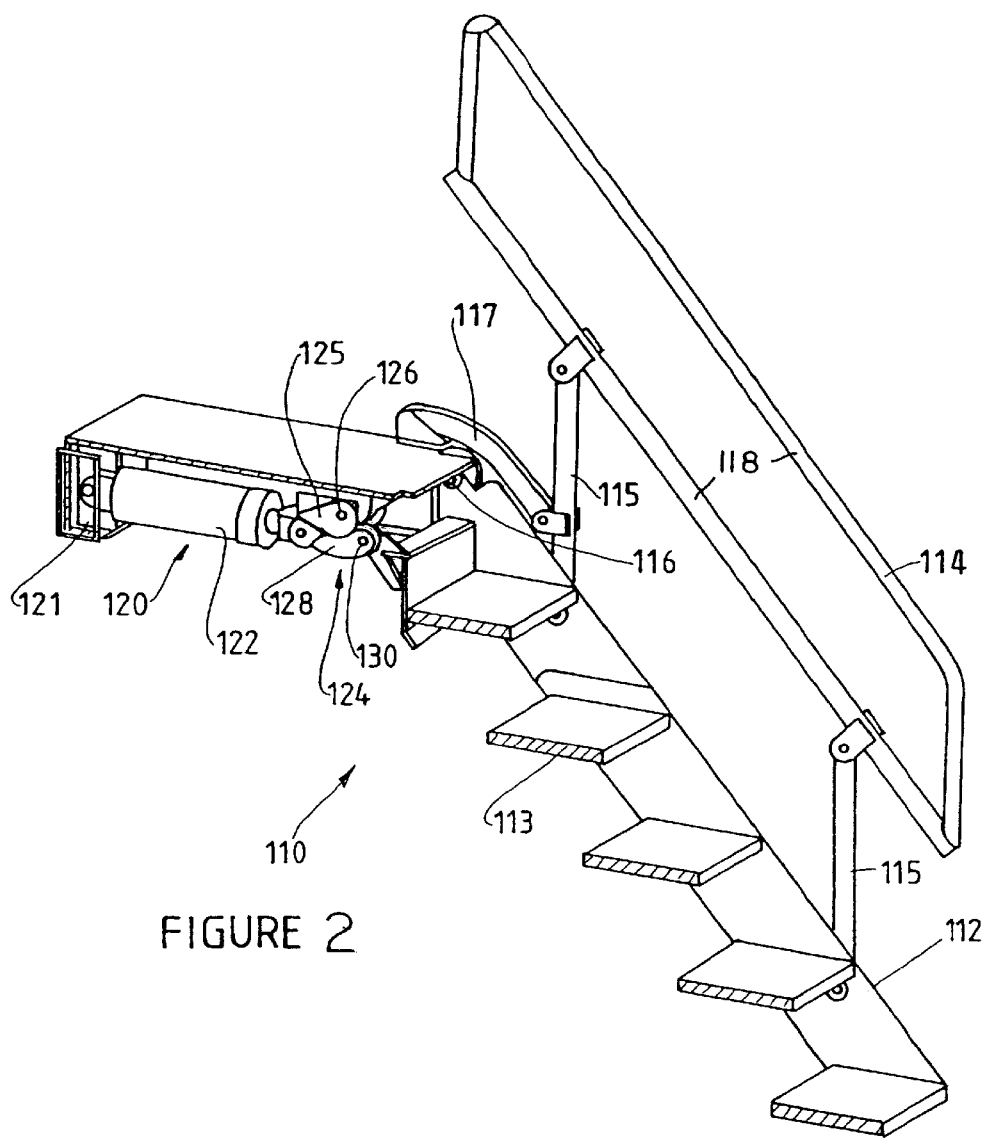
FIG. 2 is a schematic perspective view of an access device according to a preferred embodiment of the present invention.
Figure 5:
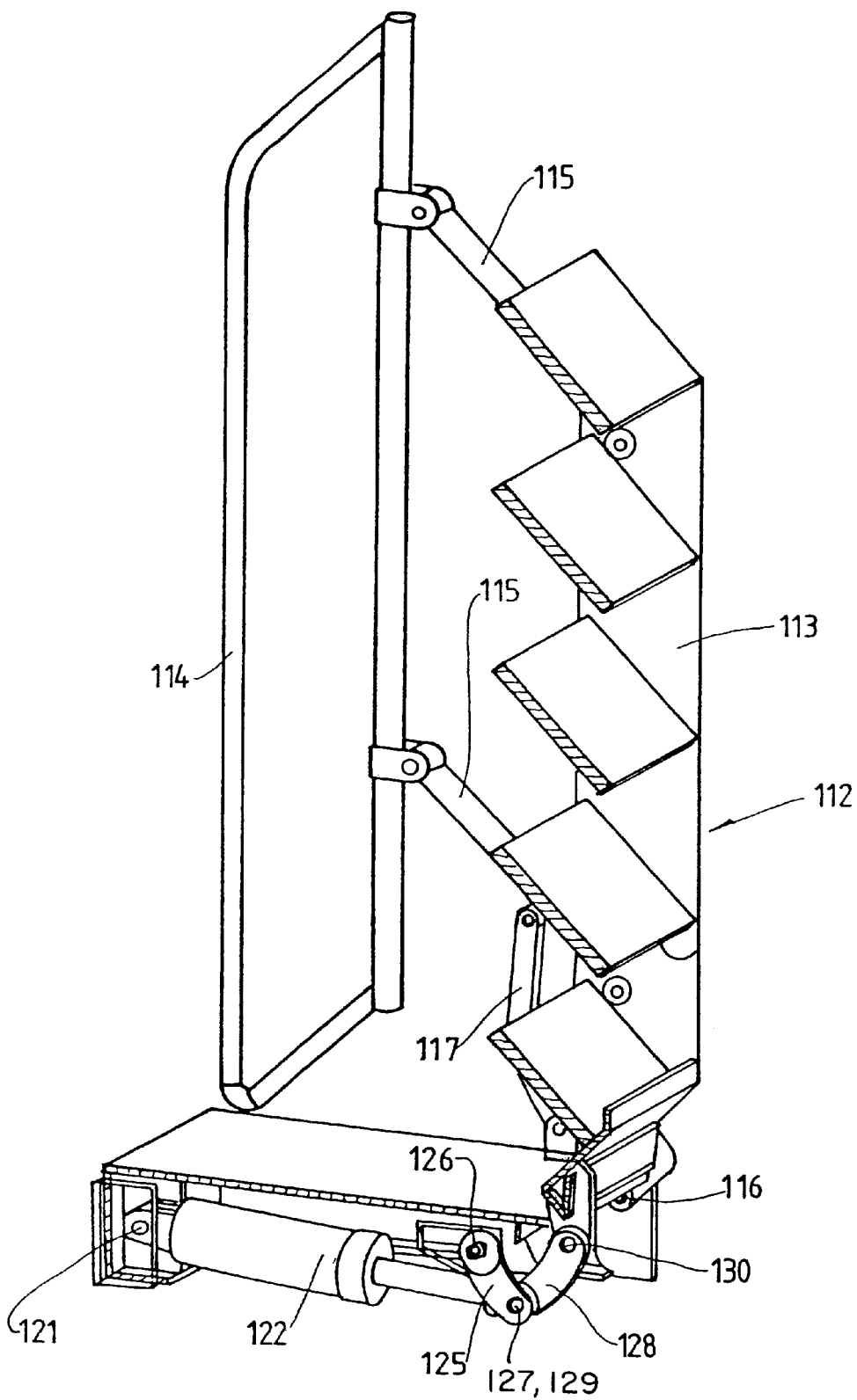
FIG. 5 is a similar schematic perspective view of the device shown in FIG. 2 in the stowed position.

Referring to FIGS. 2 to 5 of the drawings there is shown an access device generally indicated at 110. The access device 110 comprises a main body 112 which in the form shown includes a ladder or stairway 113 having a hand rail assembly 114. The ladder or stairway 113 is mounted for pivotal movement about pivot mounting 116 between an access position as shown in FIG. 2 in which the ladder 113 is inclined between lower and upper levels and stowed position as shown in FIG. 5 in which the ladder 113 is disposed in a generally upright position above the upper level.

The device further includes a drive mechanism 120 for moving the ladder 113 between the access and stowed positions, the drive mechanism 120 including a support frame 121 which is mounted to or forms part of the vehicle. As shown in FIG. 8 the pivot mounting 116 for the ladder 113 is at one end of the ladder and mounted to the support frame 121.

The drive mechanism 120 includes a drive device 122 which in the form shown comprises a linear actuator such as an hydraulic and/or pneumatic piston/cylinder assembly one end of which is pivotally mounted to the support frame 121. The linear actuator is disposed generally horizontally and its vertical displacement is limited during operation thereof. The drive mechanism further includes a link mechanism 124 interconnecting the ladder 113 with the drive device 122. The link mechanism 124 includes a control link 125 pivotally mounted to the support frame 21 at control link pivot mounting 126. The link mechanism further includes a coupling link 128 having one end operatively connected to the control link 125 at connecting point 129 and the other end operatively connected to a connecting point 130 on the ladder which is spaced from pivot mounting 116. The links 125 and 128 are curved so that they will not interfere with other components during movement thereof. The drive device 122 is operatively connected to the control link 125 at connecting point 127.

The hand rail assembly includes a frame section 118 operatively connected to the ladder or stairway 113 by support arms 115. The arms 115 are pivotally mounted to both the stairway 113 and the frame section 118 so that they can pivot during movement of the stairway 113 between the access and stowed positions thereby permitting displacement of the frame section 118. To this end there is provided a guide arm 117 operatively connected between support frame 121 and the frame section or support arms to regulate the displacement of the frame section 118 of the assembly. The displacement of the frame section 118 relative to the stairway 113 is best shown in FIGS. 9 and 4. In the stowed position the frame section 118 is displaced upwardly so that it can be accommodated above the frame 121.

Finally, it is to be understood that various alterations, modifications and/or additions may be incorporated into the various constructions and arrangements of parts without departing from the spirit or ambit of the invention.

The claims defining the invention are as follows:

1. An access device for providing access between a lower level and an upper level the access device including a main body mounted for pivotal movement about a main body fixed pivot mounting between an access position in which it enables access between the upper and lower levels and a stowed position in which a substantial part thereof is disposed above the main body pivot mounting; a drive mechanism operable to cause movement of the main body between the operative and stowed positions, the drive mechanism including a drive device and a link mechanism, the drive device comprising a linear actuator which includes a body portion pivotally mounted to a fixed structure and a drive member which can move in the direction of its longitudinal axis in a linear fashion relative to the body portion, the link mechanism including control link means mounted for pivotal movement about a control link fixed pivot mounting, the control link means being operatively connected to the drive member at a first connecting point, the main body fixed pivot mounting and the control link fixed pivot mounting being laterally disposed to the same side by longitudinal axis of the drive member, coupling link means operatively connecting the main body to the control link means, the coupling link means being connected to the main body at a second connecting point, spaced from the main body fixed pivot mounting, the arrangement being such that actuation of the drive member causes linear movement thereof which causes the connection between the coupling means and the main body to be displaced upwardly or downwardly to move the main body between the access position and the stowed position.

2. An access device according to claim 1 wherein the upwards/downwards displacement of the first connection point being substantially less than the upward/downward displacement of the second connection point during movement between the access and the stowed positions.

3. An access device according to claim 1 or 2 wherein the connection between the control link means and the coupling link means is such to cause the coupling link means to move towards a generally upright orientation when the main body is moved towards the stowed position.

4. An access device according to claim 1 or 2 wherein the first connection point is adapted to swing through a substantially flat arc with respect to the horizontal when moving between the two positions.

5. An access device according to claim 1 or 2 wherein the drive device comprises an hydraulic piston/cylinder assembly, the cylinder being pivotally mounted to a fixed structure and the piston being operatively connected to the control link means at the first connecting point.

6. An access device according to claim 5 wherein in the access position the first connecting point is disposed above the connecting point between the control and coupling link means and when in the stowed position the first connecting point is disposed below the connecting point.

7. An access device according to claim 6 wherein the main body includes an elongated member which in the access position extends between the upper and lower positions with one end thereof being adjacent or resting on the lower level and the other end being adjacent the upper level and in this position, the main body being inclined with respect to a vertical axis and in the stowed position is disposed generally upright above the upper level and preferably vertically above the main body pivot mounting point.

8. An access device according to claim 7 wherein the control link pivot mounting and the first and second connecting points are spaced from one another so that a line drawn from the first connecting point to the control link pivot mounting and then from the control link pivot mounting to the second connecting point is generally V-shaped.

9. A device according to claim 6 wherein said linear actuator is generally horizontally disposed.

10. A device according to claim 1 further including a hand rail assembly which includes a frame section operatively connected to the main body by at least one support arm, the or each arm being pivotally mounted between the main body and a fixed support so that it can pivot during movement of the main body between the access and stowed positions thereby permitting displacement of the frame section and a guide arm operatively connected between the fixed support and the main body or support arm to regulate the displacement of the main body.

* * * * *